United States Patent
Kocher et al.

(10) Patent No.: US 12,141,327 B1
(45) Date of Patent: Nov. 12, 2024

(54) INTERNET PROFILE DILUTION DEVICE (IPDD)

(71) Applicants: Robert William Kocher, McLean, VA (US); Douglas Earl Dyer, Herndon, VA (US); Andrew Christopher Isett, Washington, DC (US); John Shelly Bowling, II, Reston, VA (US)

(72) Inventors: Robert William Kocher, McLean, VA (US); Douglas Earl Dyer, Herndon, VA (US); Andrew Christopher Isett, Washington, DC (US); John Shelly Bowling, II, Reston, VA (US)

(*) Notice: Subject to any disclaimer, the term of this patent is extended or adjusted under 35 U.S.C. 154(b) by 403 days.

(21) Appl. No.: 17/238,703

(22) Filed: Apr. 23, 2021

Related U.S. Application Data (63) Continuation-in-part of application No. 16/793,806, filed on Feb. 18, 2020, now Pat. No. 10,990,700.

(51) Int. Cl.
| | | |
|---|---|---|
| *G06F 21/62* | (2013.01) | |
| *G06F 16/951* | (2019.01) | |
| *G06F 16/9535* | (2019.01) | |
| *H04L 67/50* | (2022.01) | |

(52) U.S. Cl.
CPC ........ *G06F 21/6263* (2013.01); *G06F 16/951* (2019.01); *G06F 16/9535* (2019.01); *H04L 67/535* (2022.05)

(58) Field of Classification Search
CPC ............... G06F 21/6263; G06F 16/951; G06F 16/9535; H04L 67/535
See application file for complete search history.

(56) References Cited

U.S. PATENT DOCUMENTS

| 6,594,662 B1* | 7/2003 | Sieffert ................. G06Q 30/02 |
| 2002/0038431 A1* | 3/2002 | Chesko ................. H04L 63/04 |
| | | 726/26 |
| 2007/0094738 A1* | 4/2007 | Carter ................. G06Q 30/02 |
| | | 348/E7.069 |

(Continued)

OTHER PUBLICATIONS

Y. Yang, "Next Generation of Impersonator Bots: Mimicking Human Browsing on Previously Unvisited Sites", DOI 10.1109/CSCloud.2015.93, Sep. 2015, 2015 IEEE 2nd International Conference on Cyber Security and Cloud Computing, 7 pages (Year: 2015).*

*Primary Examiner* — Han Yang (57) ABSTRACT

An internet profile dilution device and method are provided. To prevent the sale of individual user's internet searches to advertisers, an internet profile dilution software is configured to significantly dilute the individual search and browsing by opening a site the individual has selected, or in the default state, will automatically select from a variety of news outlet websites for dilution of the individual's internet profile. The internet profile dilution software will scan the site, for links to another article, and will navigate to that article and spend a random amount of time appearing to read the article. The software will search for particular words from the title of the article to continue to further dilute the internet profile of the individual. The individual's internet search is sufficiently diluted by the internet profile dilution software so that an accurate profile of the individual's internet search and browsing cannot be established.

11 Claims, 11 Drawing Sheets

(56) References Cited

U.S. PATENT DOCUMENTS

2014/0143882 A1* 5/2014 Saniee ............... G06F 21/6263
                                                          726/26
2016/0330237 A1* 11/2016 Edlabadkar ......... H04L 63/1475
2019/0130023 A1*  5/2019 Kataria ................ G06F 16/338

* cited by examiner

Keywords For Interests

1720

Examples

| Interest: Sailing | Interest: Motorcycling |
|---|---|
| Keywords: | Keywords: |
| Abeam | Ape Hangers |
| Aboard | Bikini Fairing |
| Admiralty Law | Beanie Helmet |
| Adrift | Belt Drive |
| Afloat | Bobber |
| Aft | Cafe Racer |
| Aground | Center Stand |
| Ahoy | Chain Drive |
| Alee | Chopper |
| America's Cup | Counter Steer |
| Anchor | Dirt bike |
| Anemometer | ... |
| Argosy | Lane Splitting |
| ... | Master Link |
| Sailor | Open Face Helmet |
| Sails | Parallel Twin |
| Schooner | Pushrod Engine |
| Seafaring | Rat Bike |
| Seaworthy | Scrambler |
| Shipshape | Side Stand |
| Sloop | Sport Bike |
| Spinnaker | Steering Head |
| Starboard | Stoppie |
| ... | Swingarm |
| Wharf | Touring Bike |
| Whitecap | Twist Grip |
| Yacht | V-Twin |
| Zephyr | Wheelie |

Example Categories and Sub-categories:

...
Vehicles & Parts > Vehicles > Aircraft
Vehicles & Parts > Vehicles > Land Vehicles
Vehicles & Parts > Vehicles > Land Vehicles > Camper Vans
Vehicles & Parts > Vehicles > Land Vehicles > Cars, Trucks & Vans
Vehicles & Parts > Vehicles > Land Vehicles > Golf Carts
Vehicles & Parts > Vehicles > Land Vehicles > Motorcycles & Scooters
Vehicles & Parts > Vehicles > Land Vehicles > Off-Road and All-Terrain Vehicles
Vehicles & Parts > Vehicles > Land Vehicles > Off-Road and All-Terrain Vehicles > ATVs & UTVs
Vehicles & Parts > Vehicles > Land Vehicles > Off-Road and All-Terrain Vehicles > Go Karts & Dune Buggies
Vehicles & Parts > Vehicles > Land Vehicles > Snowmobiles
Vehicles & Parts > Vehicles > Watercraft
Vehicles & Parts > Vehicles > Watercraft > Motorboats
Vehicles & Parts > Vehicles > Watercraft > Personal Watercraft
Vehicles & Parts > Vehicles > Watercraft > Sailing Boats
Vehicles & Parts > Vehicles > Watercraft > Yachts
...

INTERNET PROFILE DILUTION DEVICE (IPDD)

CROSS-REFERENCE TO RELATED APPLICATIONS

This present application is a continuation-in-part of the U.S. application Ser. No. 16/793,806 Filed Feb. 18, 2020, the entire contents of which is hereby incorporated herein by reference.

FEDERALLY SPONSORED RESEARCH

None

BACKGROUND

Field of the Invention

The invention relates to the general field of providing Internet anonymization; and specifically relates to an Internet Profile Dilution Device (IPDD).

Description of the Related Art

Certain companies have been commonly known to build profiles from individual's internet searching and browsing habits. These profiles and data are sold to the highest bidder, exposing you to highly targeted advertising and offers you will find it difficult to say no to. It is common for individuals to be on web sites and have the web-site information surrounded by advertisements and images of items that are similar to items they have recently purchased, targeted advertising. With the help of modem-day machine learning and big-data analysis, these systems could be used to obscure or limit selection from you, as well as to influence your decision-making process. Today, the steps needed to take for avoiding the collection of this data, or the building of your own unique internet searching and browsing profile, are often too difficult to use.

One might ask whether having a Virtual Private Network (VPN) can protect them from having their internet searching and browsing used to identify their purchasing habits. It is true that a VPN can make it more difficult for a company to build a profile of your internet search habits. As an example, your IP address can be obscured, or your geolocation can be hidden within their network. The companies collecting your internet searching and browsing data can still build profiles from your hardware, device, video resolution, operating system, Central Processing Unit (CPU) or Random-Access Memory (RAM), which browser you're using, from among other data points. Certain VPN services may also collect the searching and browsing data and sell that data to the highest bidder as well. As a result, using a VPN simply adds yet another third-party company who may collect data on your searching and browsing habits.

What about false Identities? Creating or using false identities or fake accounts may protect you from some tracking. However, unless you're changing your hardware device, location, and Internet Service Provider (ISP), each time you create a new fake identity, this method again fails to fully protect you from tracking. In addition, this method of using a false identity is likely against the terms of service of many websites, so you may find some websites will block you from creating additional false profiles of fake identities.

Other options include disabling Third Party cookies or 'In-Private' or 'Incognito' Modes on browsers. Tracking and profiling are still simple, but these methods aren't designed to prevent the profiling company from adding to their databases. As a recent example, one known company was still using location-tracking data for people who had 'opted-out' from their service.

Using Anonymizing Tor (The Onion Routing network) proxies, and the setup requirements to prevent building profiles is too difficult for the layman. As large amounts of the internet is still accessible using insecure or unauthenticated (Hypertext Transfer Protocol [HTTP]vs Hypertext Transfer Protocol [HTTPS]) traffic, Tor still allows some identification, which could result in certain entities still being able to build a unique profile based on your system and searching and browsing habits.

Some patents related to the field of classification and building profiles are as follows:

U.S. Pat. No. 5,933,811, which is directed to a system and method for delivering customized advertisements within interactive communication systems.

U.S. Patent Publication US2016/0217446, which is directed to systems and methods to deliver targeted advertisements to audience.

U.S. Pat. No. 6,055,573, which is directed to communicating with a computer based on an updated purchase behavior classification of a particular consumer.

U.S. Patent Publication US 2001/0049620, which is directed to a privacy-protected targeting system.

U.S. Pat. No. 8,566,164, which is directed to targeted online advertisements based on viewing or interacting with television advertisements.

U.S. Pat. No. 7,853,533, which is directed to a method and system for identifying users and detecting fraud by use of the internet.

Japanese Patent JP2014/528,125, which is directed to protecting privacy or defeating Profiles.

Although there are patents in the general field of this patent application, none of the above -listed patents and publications, alone or in any combination, teach or suggest the claimed invention, as set forth, infra.

SUMMARY OF THE INVENTION

It is an object of the invention to prevent an ISP or website or a third party from being able to develop a profile of an individual based upon searching and browsing habits. This needs to be done to protect the searching and browsing habits of individuals. In addition, an individual should not be paying for internet service and have the company providing the internet service, or other companies create and sell their profile information to advertisers. Nor should consumers be led to particular advertisers who may not have the best product or the best price for a consumer. Nor should consumers be exposed to advertisements that they are not interested in buying. In addition, if a consumer's spouse buys an item such as a dress or shoes online using their spouses' computer, the spouse's computer screen should not thereafter be filled with advertisements for ladies' dresses and shoes. Nor should a situation exist where one spouse views all types of advertisements for items they don't purchase and creates problems with their spouse for their spouses' apparent purchases.

The solution provided by this invention of working within the data collection network that these entities have established provides for the creation of a system of diluting the searching and browsing information so that an internet profile cannot be relied upon. In this application, we use the term "surf engine" to mean searching and browsing the Internet. The reason is that by diluting the searching and browsing data to a very large extent that advertising companies will be unwilling to pay advertising dollars for such heavily diluted profile information. The system of the present invention works because other "privacy" solutions work by attempting to bypass or work outside of the tracker. The solution to the above-identified problems is unique and different from the prior art by working within the data collection network these entities have established.

What the system does is as follows. The Software [Installable Software Application] is installed on all devices where personally identifiable websites are accessed. The software, at random times, will begin opening a site you've selected, or in the default state, will automatically select from a variety of news outlet websites. Once the news site is open, the software then begins scanning the site, for links to another article. It will navigate to that article and spend a random amount of time 'appearing' to read the article. The Software will then open a new tab, and search using a term or subject you've selected, or for a particular word or subject from the title of the previous article. The software will collect data from other websites and browse articles from the 'popular' website rankings or social media feed sites. The software could be customized to build "alternate profiles" as well, where it could follow local sports teams, or particular hobbies, or other interests. For example, the "profile" options could be a doctor, a baseball fan, an art collector, or a person interested in technology, once the end user has selected a particular "alternate profile" the Software searches for that profile's items or terms or news.

The reason the instant invention works so well is that our approach to the problem is unique and will work because we're working within the system that the data collection entities have already established. As they analyze and collect the searching and browsing data gathered from systems running our software, 25% or more of the data will be random requests from our software. This high level of randomness of 25% or more of data will make the individual user's web searching and browsing useless to advertising companies who will see a drop in purchases for their many clients. To reduce the value of individual user's internet searching and browsing data to advertisers, the Internet Profile Dilution Software is configured to significantly dilute the individual's web usage by opening a site the individual or end user has selected, or in the default state, will automatically select from a variety of news outlet websites for dilution of the individual's searching and browsing data. The Software will scan the site, for links to another article, and will navigate to that article and spend a random amount of time appearing to read the article. The diluter will search for particular words from the title of the article to dilute the internet search of the individual. The Software emulates keystrokes, emulates the user, emulates mouse clicks, site visits, word searches, location, etc.

LIST OF REFERENCE NUMERALS FOUND IN THE DRAWINGS

Element 100 refers to an internet profile dilution device.

Element 200 represents a users' computer, smart phone, etc.

Element 300 represents the internet cloud where the user search profile is stored.

Element 400 represents an internet provider.

Element 500 represents a list of searches from an individual, approximately 128 pages in total.

Element 600 represents the advertisers to whom the internet providers sell an individuals' internet profile.

Element 610 represents a communication link from the internet searches of an individual and the advertisers.

Element 620 represents a communication link from the advertisers and the internet service provider.

Element 630 represents a communication link from the internet service providers to the computer of the individual.

Element 640 represents a link between the internet service providers and the internet cloud.

Element 700 represents the internet profile dilution device which can be hardware or installed software or both.

Element 720 represents a connection to the internet which transmits diluted information so the individual's internet usage cannot be tracked.

Element 730 represents a communication link between the individual's computer and the surfing engine which will create the diluted information.

Element 800 represents the cloud or service where the highly diluted information is created and/or stored.

Element 820 represents a communications link between the individual's computer and the cloud or service.

Element 840 represents a communications link between the cloud or service and the individual's computer.

Element 900 represents the diluted profile, visited sites and the personal profile of the individual.

Element 910 represents the personal profile of the individual.

Element 920 represents the diluted profile.

Element 930 represents internet searched and browsed sites.

Element 940 represents communication links between the diluted profile and the personal profile.

Element 945 represents an individual using the internet dilution system.

Element 950 represents the communication links between the diluted profile and the internet surfing sites.

Element 955 represents a communication link between the individual using the internet dilution system and the internet provider 990.

Element 965 represents a communications link between the internet dilution device 700 and the individual using the internet dilution device.

Element 970 represents a communications link between the internet dilution device and the computer 200.

Element 990 represents an internet provider's database containing all of the individual user's searches, where the database is at an internet provider who is profiling the user's internet searches to sell to advertisers.

Element 1710 represents a speech-to-text transcription component used to convert spoken language in an audio track in a video or podcast into text to facilitate analysis.

Element 1720 represents a database of keywords such that we expect that internet content that includes some of those keywords to be relevant to a particular interest.

Element 1800 represents the entropy generator.

Element 1810 represents the selection of search category process.

Element 1820 represents the natural language generator.

Element 1830 represents the process of executing a search string generated from the natural language generator.

Element 1900 represents an RF receiver used to receive environment noise.

Element 1910 represents the RF signal demodulation process.

Element 1920 represents the IPDD processor.

Element 1930 represents the storage of the seed vector.

Element 2000 represents the top-level search category.

Element 2010 represents the low-level search category or search sub-category.

Element 3000 represents the submitting of a search category to a search engine.

Element 3010 represents the process of storing the suggested search strings response from a search engine.

Element 3020 represents the storage of search strings to be searched in a search engine.

DETAILED DESCRIPTION OF EXEMPLARY EMBODIMENTS OF THE INVENTION

The claimed invention relates to an internet profile dilution system which is configured such that a website or internet provider cannot distinguish between a user of the claimed systems internet searching and browsing habits, the dilution device or the cloud dilution which emulate the user. The emulation of the user makes it very hard or impossible for a website or internet provider to determine an accurate internet searching and browsing profile of the individual using the internet profile dilution system.

Figure 1:
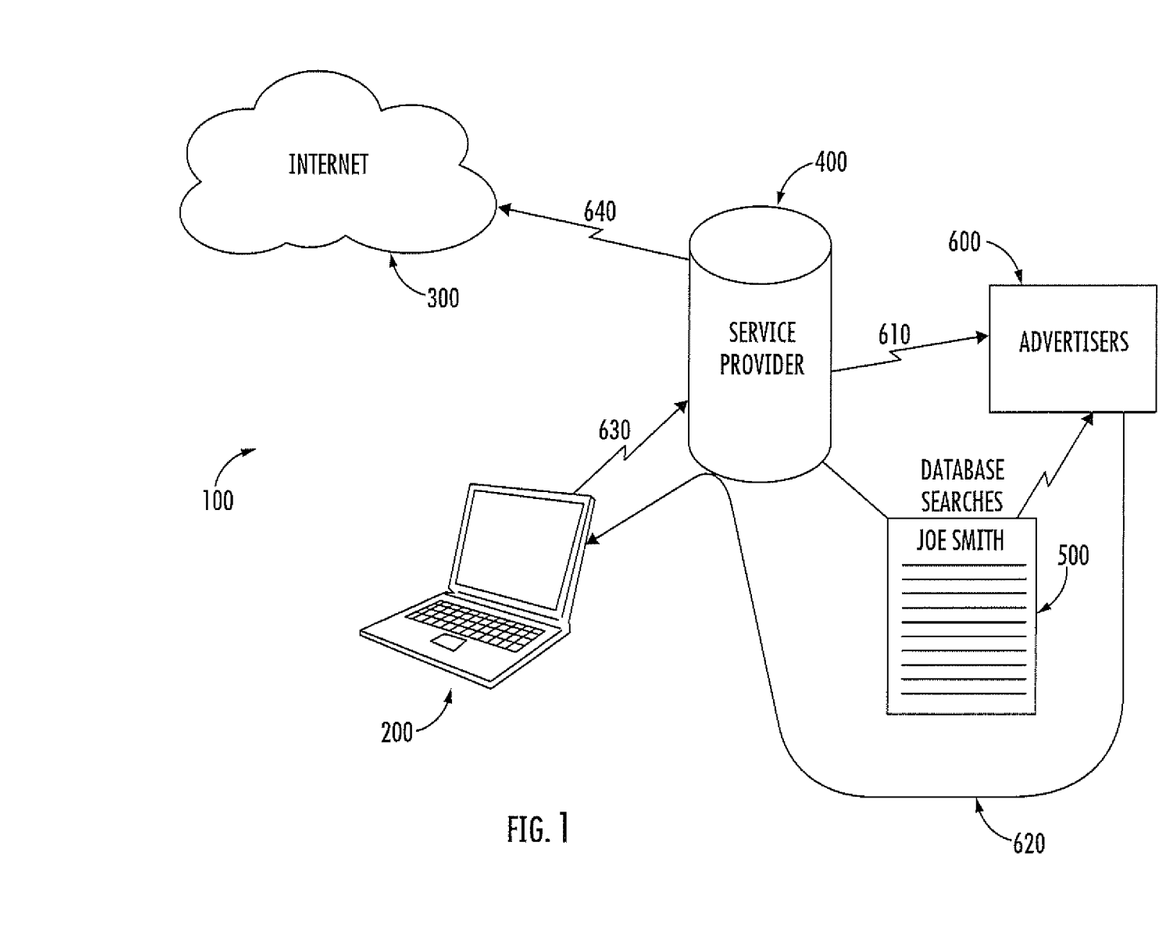
FIG. 1 is directed to the system having an internet profile device.

Turning to FIG. 1, this representative figure illustrates an overview of the problem being overcome by the claimed system. In FIG. 1, element 100 represents the overall system. Element 200 represents a computer used by an individual searching and browsing the internet. The internet is illustrated by element 300. An internet service provider who is creating an internet profile of the individual's searching and browsing habits while using the internet is represented by element 400. As shown by element 500 is a collection of approximately 128 pages of data related to the searching and browsing habits collected by the internet provider or other company, on the user, who we will refer to as "Joe Smith." Element 600 represents the advertising company that has purchased the individual's internet search and browsing profile 500 from the internet service provider 400. Element 610 is a communications link at the internet service provider 400 which sends the individual's internet search and browsing profile to the advertising company 600. Element 620 represents advertisements sent from the advertising company 600 to the computer 200 of the user. The communication with the advertisements are sent to the individual's computer 200 via the internet service provider 400. The advertisements are focused to the individual user based on their internet search and browsing profile. The element 700 represents a profiling of an individual's searches is based on the individual having no right to privacy of their searches.

Figure 2:
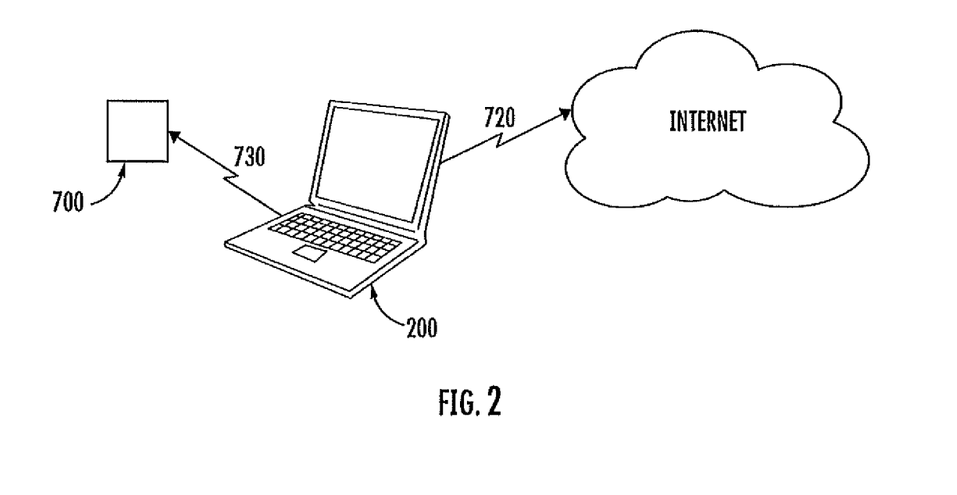
FIG. 2 the device that attaches to an individual user's computer to dilute the ability of a company to create an accurate internet profile to be sold to advertisers.

Turning to FIG. 2, this figure illustrates the dilution device and/or dilution software that dilutes the internet search and browse profile of the individual. As shown in FIG. 2, element 700 represents the internet profile dilution device which is a piece of hardware and/or software which is connected to the individual's computer 200 by way of a wired 730 or a wireless connection with the individual's computer 200. The internet profile dilution device can be modified to dilute based on randomness or by being focused on items such as sports, news, etc. The internet profile dilution device 700 will learn your profile based on speed, data entry, etc., and performs searches that are opposite what you have searched. These opposite searches, etc. become interspaced with the actual searches of the individual. Element 720 represents connection of your internet searches, including the dilated internet searches performed by the internet profile dilution device 700. The result is that the internet provider who is creating the individual's internet profile 500 for sale to advertisers is unable to create a profile that is of any economic value because the profile they create is mostly unrelated to the individual user.

Figure 3:
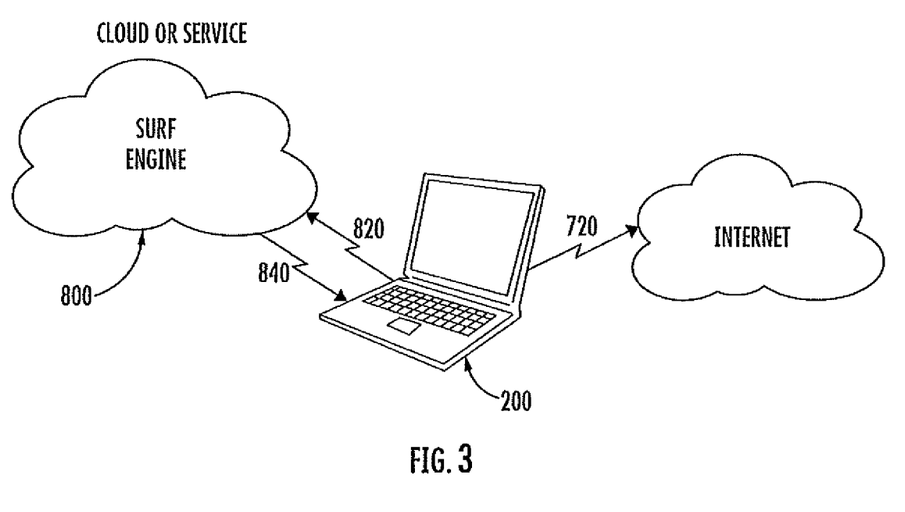
FIG. 3 is directed to the internet profile dilution device and cloud dilution device used to dilute the customer's searches.

Turning to FIG. 3, this figure illustrates an exemplary embodiment where the internet profile dilution device is located in a cloud 800. Element 820 represents a communication link between the individual user's computer 200 to the cloud 800 where the internet profile dilution takes place. From cloud 800, the diluted profile is transmitted to the individual user's computer 710. From the individual computer's computer 200, the diluted internet profile is forwarded to the internet via communication's line where the internet provider uses the individual's internet search and browsing habits to create a user's internet profile which is sold to advertiser or advertisers. In operation, the individual's internet profile is diluted by 25% or more, which makes it very difficult or even impossible for an internet provider or other company to create an accurate profile.

Figure 4:
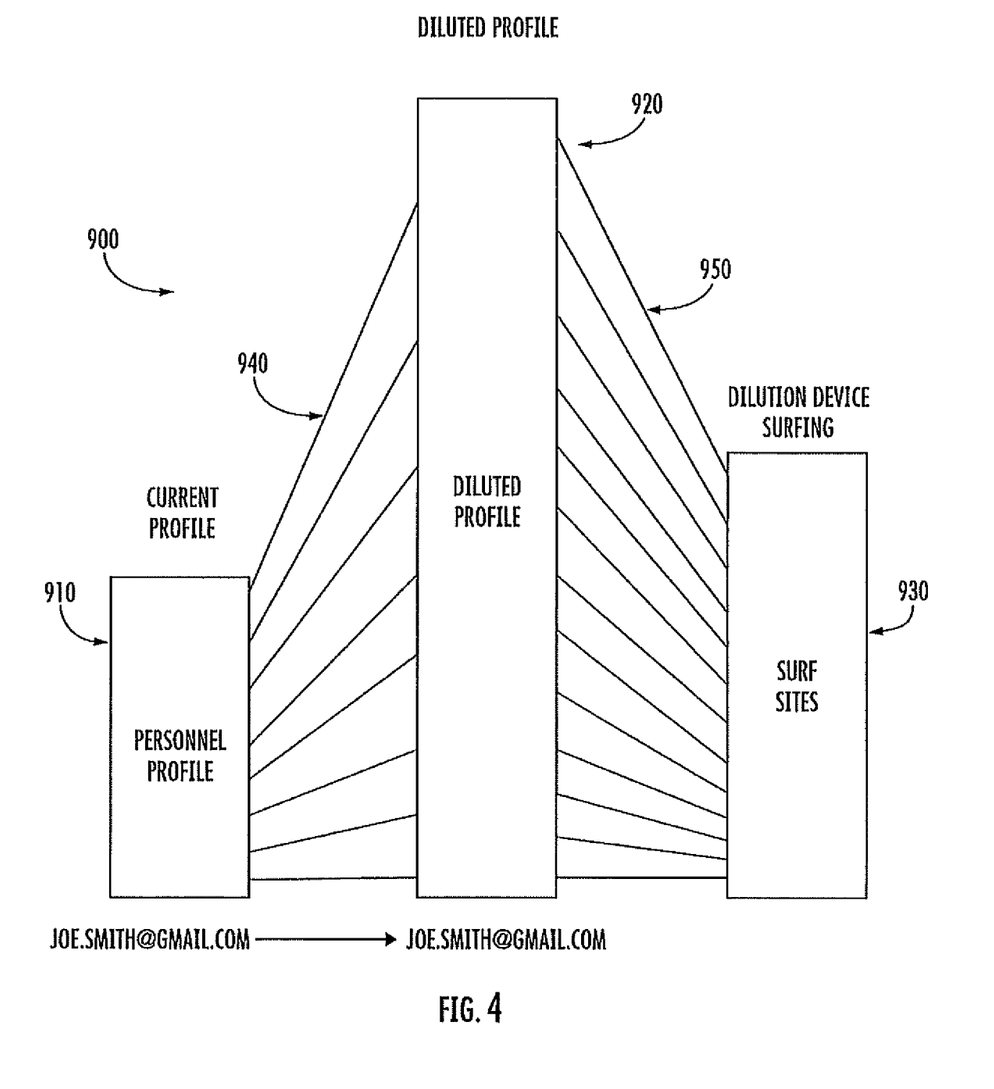
FIG. 4 is directed to a sample dilution profile.

Turning to FIG. 4, this figure illustrates an example of a diluted profile 900 in accordance with an exemplary embodiment of the invention. FIG. 4 illustrates a diluted internet profile for individual "Joe Smith." Element 910 represents the current internet profile of individual user Joe Smith. Element 930 represents the relative size of the diluted profile. The dilution device's search and browsing data is shown by surf sites 930. Element 940 represents communication lines between the personal profile of the individual user Joe Smith. Element 950 represents the communication line between the searched and browsed sites of the dilution device which browses sites not visited by Joe Smith. In operation, the current internet profile 910 of the individual user Joe Smith is diluted by the internet profile dilution device's searched and browsed sites 930. The complete search of the individual user Joe Smith is transmitted to the diluted profile 920 of the diluted profile device and/or software. The solution provided by this invention of working within the data collection network that these entities have established provides for the creation of a system of diluting the search and browsing information so that an internet profile cannot be established. The reason is that by diluting the profile to a very large extent that advertising companies will be unwilling to pay advertising dollars for such heavily diluted profile information. The system of the present invention works because other "privacy" solutions work by attempting to bypass or work outside of the tracker. The solution to the above-identified problems is unique and different from the prior art by working within the data collection network these entities have established.

What the system does is as follows. Software [Installable Software Application (Software)] is installed on all devices where personally identifiable websites are accessed. The software, at random times, will begin opening a site you've selected, or in the default state, will automatically select from a variety of news outlet websites. Once the news site is open, the software will then begin scanning the site, for links to another article. It will navigate to that article and spend a random amount of time 'appearing' to read the article. It will then open a new tab, and search using a web browser you've selected, or the default browser search engine for the browser, for particular words from the title of the article. The software will collect data from other websites and open and browse articles from the 'popular' website rankings or social media feed sites.

The software could be customized to build "profiles" as well where it could follow local sports teams, or particular hobbies, or other interests. For example, the "profile" options could be a doctor, a baseball fan, an art collector, or a person interested in technology, once the end user has selected a '"profile" which searches for particular, items or terms or news. The search performed by the dilution device, may be the opposite of what the individual internet searcher was searching for.

The reason the instant invention works so well is that our approach to the problem is unique and will work because the claimed invention is working within the system that the data collection entities have already established. As they analyze and collect the data gathered systems running our software, 25% or more of the data will be random requests from Applicant's service. This high level of randomness of 25% or more of data will make their profile useless to advertising companies who will see a drop in purchases for their many clients.

Figure 5:
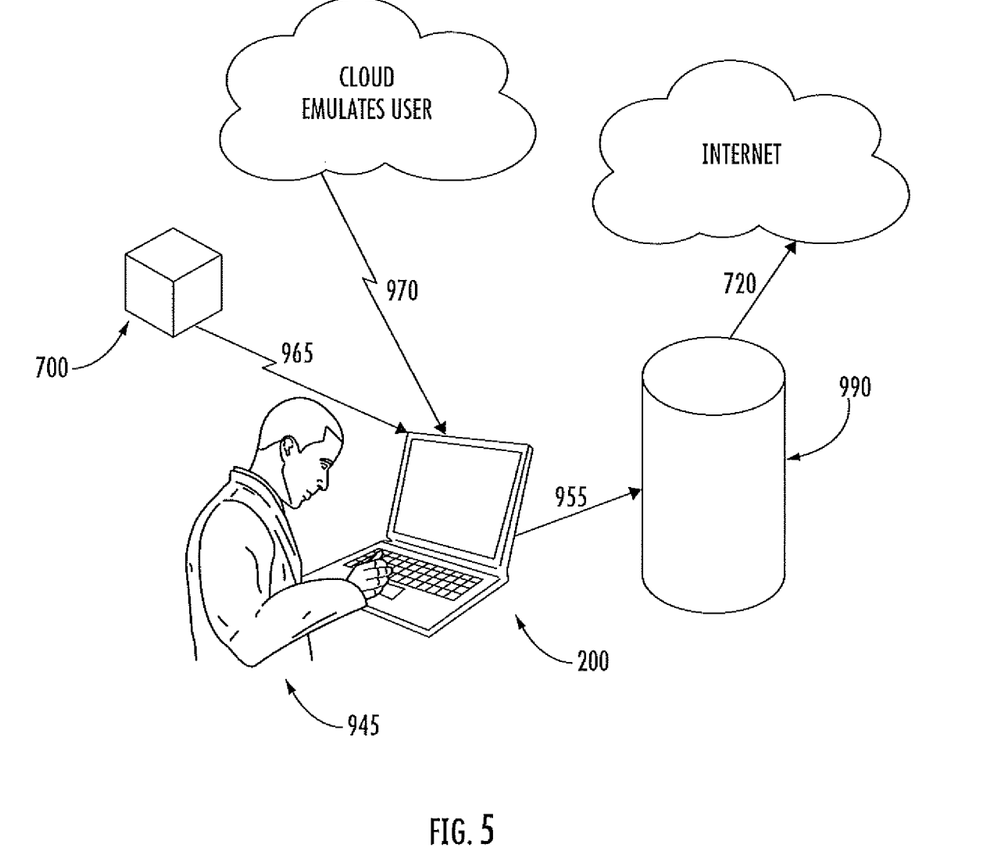
FIG. 5 Is directed to condition the internet traffic to make it very hard to identify the user device or process, such that the internet provider cannot distinguish between your searches and the internet profile dilution device or the cloud dilution device.

Turning to FIG. 5, this figure relates to conditioning internet traffic to make it difficult for an internet provider to identify the device or 11P address the diluted information is coming from. Element 945 represents an individual user typing an internet search on a keyboard of a computer 200. At cloud 800, the individual user's internet search is emulated and greatly diluted. The diluted search is then transmitted through communication line 970 to the individual user's computer 200 and from computer 200 to an internet provider database 990 containing the individual user's internet searches, about 128 pages, of internet searches at the internet provider's search engine 990. From the internet provider database 990, the profile is sent to advertisers 980 within the internet 720.

From all of the above, the dilution system is configured such that an internet provider cannot distinguish between an individual internet searcher's searches, the internet profile dilution device or cloud the individual is using or the cloud dilution device.

Figure 6:
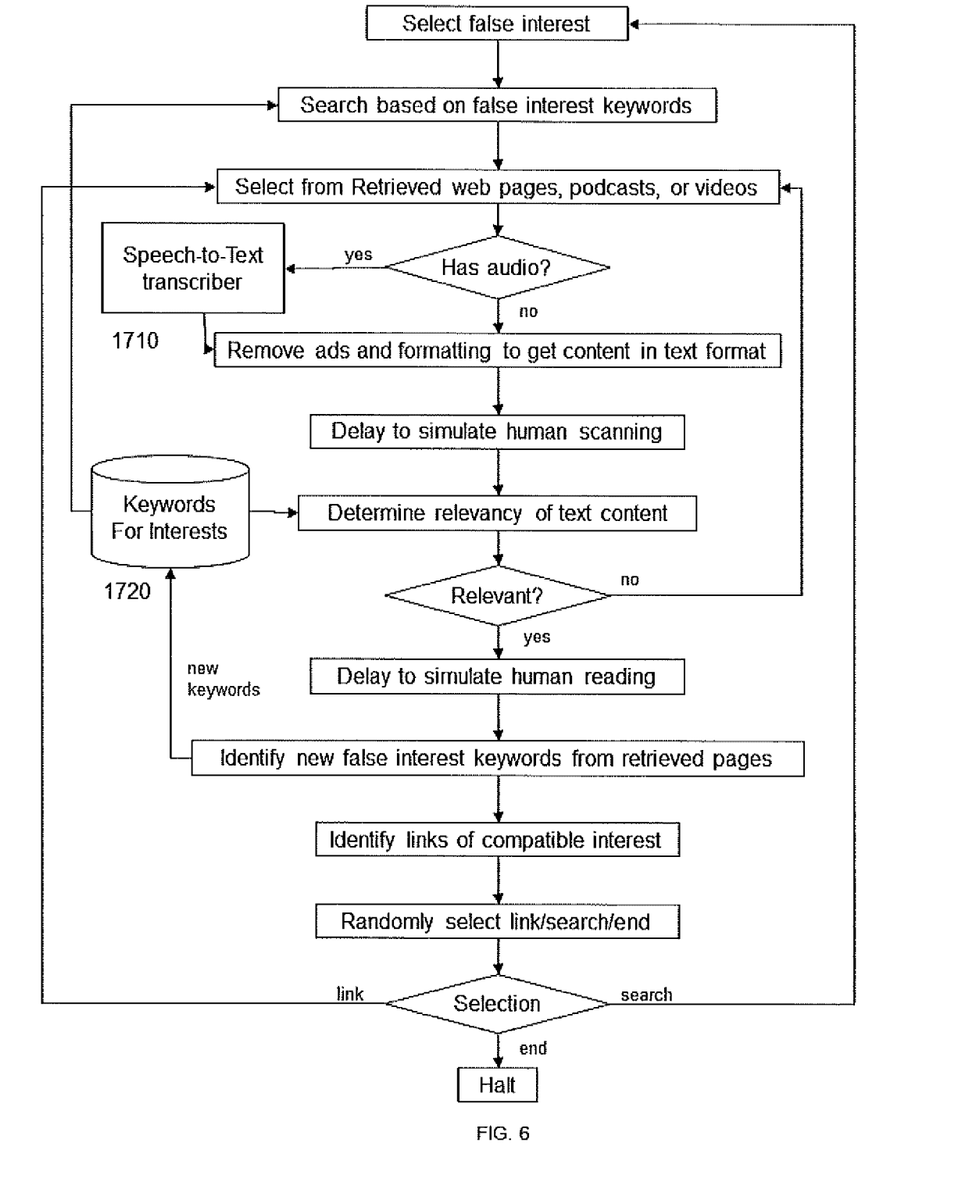
FIG. 6 describes a method and procedure for determining content relevancy and responding in realistic ways that make it very hard for the internet provider to distinguish between your searches and the internet profile dilution device or cloud dilution device.
Figure 7:
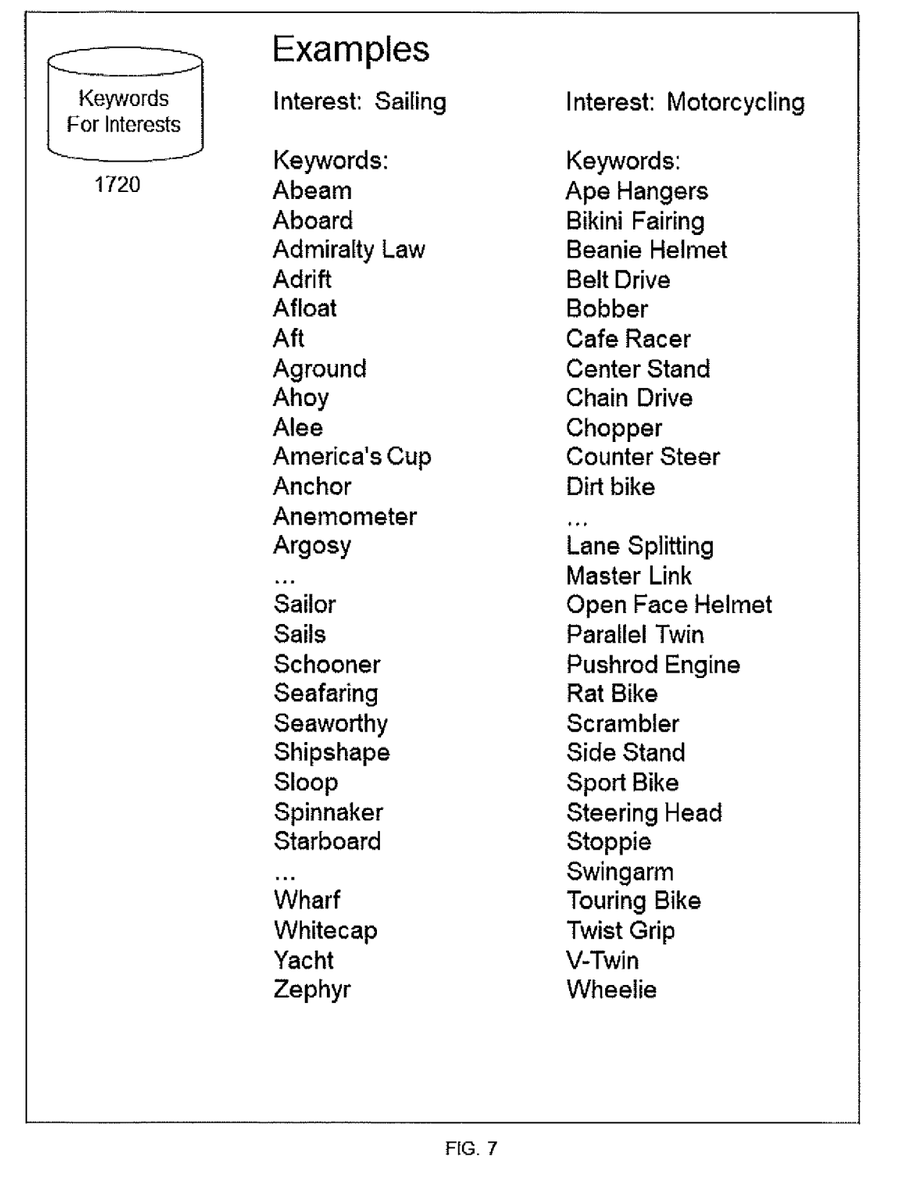
FIG. 7 lists example keyword sets associated with an interest such that we expect internet content that includes some of those keywords to be relevant to a particular interest.

FIG. 6 provides more detail about how the internet profile dilution device 700 emulates human internet search behavior. A human search based on his or her topics of interests using keywords or natural language questions in a search engine. The search engine returns a list of web pages and videos, and the human selects some that seem most relevant, quickly discarding those that turn out to not be relevant while spending more time with those that are relevant. After consuming the content of one web page or video, a human user might continue to search the same interest by selecting again from the same search hits, or the human might search again based on a different interest, or the human might be distracted or intrigued by a link in a current web page and begin searching on a tangential or more detailed subject. This is a basic but realistic pattern of how humans browse the internet. The process used by an automated internet profile dilution device must mirror these steps, and it does as shown in FIG. 6. The automated process selects a false interest that the human doesn't care about as a topic of search. In an embodiment, choosing the interest is done randomly while in another embodiment, the human selects false interests. In the internet profile dilution device, there exists a database 1720 that has a set of keywords associated with interests as explained by example in FIG. 7, and for each interest, keywords associated have the property that internet content containing them can be expected to be relevant to the interest with which they are associated. As shown in the example lists in FIG. 7, key phrases that combine words are also acceptable as keywords. Depending on the embodiment, the automated process uses the interest name, associated keywords, linguistically similar terms, and even natural language questions created from speech generation to create queries for a search engine. The search engine, which is separate from our invention, returns internet content in the form of web pages, videos, and other content such as audio podcasts in response to the search query, and the automated process selects one of the links to the returned content and retrieves it. If the selected content contains audio, it is converted into text, and in any case advertisements and web formatting is removed to provide the main content in text form for analysis. A brief delay of random length is inserted to simulate human assimilation of the content, and then the automated process determines whether the text content is relevant to the selected false interest. Determining relevancy is a matter of checking to see if the text content includes some of the keywords associated with the interest. If the text content is found not to be relevant, then automated process selects another of the links and continues as shown in FIG. 6. Alternatively, if the text content is found to be relevant, then the automated process inserts a longer delay to simulate human assimilation of the content. In an embodiment, new relevant keywords are learned using by machine learning and added to the list for the selected interest in the database 1720. Also, links within the selected internet content are assessed for relevancy. Afterwards, the automated process randomly selects what to do next. Among the possibilities are (1) following a link within the selected internet content, preferring but not limited to those links that are relevant, or (2) searching again using a selected interest, or halting. This entire automated process is repeated randomly or at a time selected to simulate the human, depending on the embodiment. In this way, the automated process used by the internet profile dilution device mimics the basic pattern of browsing by a human.

Humans vary in their browsing habits in terms of the amount of focus on a topic and the tendency to get distracted by other topics. In some embodiments, these parameters are also modeled and used by the internet profile dilution device. In an embodiment, the human user of the internet profile dilution device estimates values for these parameters while in another embodiment, the internet profile dilution device uses machine learning to observe the human user's browsing habits and estimate parameter values.

To mimic other observable patterns associated with internet use, the internet profile dilution device must also mimic other parameters such as the time of day for browsing, total time spent browsing each day, and the devices and browsers used by time. In some embodiments, these other parameters are also modeled and used by the internet profile dilution device to mimic human behavior. In an embodiment, the human user of the internet profile dilution device estimates values for these parameters while in another embodiment, the internet profile dilution device uses a procedural algorithm to observe the human user's browsing and statistically calculate the parameters over the observation period.

Figure 8:
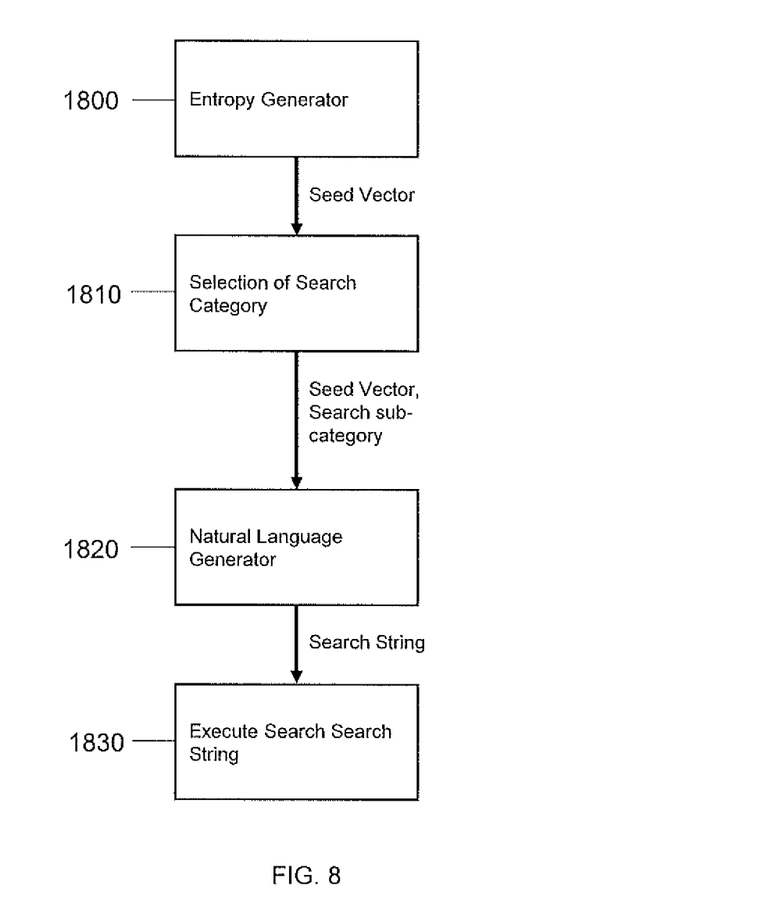
FIG. 8 describes the general process of creating and executing internet searches based on natural language generation (NLG) and supplied entropy.

As depicted in FIG. 8, the entropy generator 1800 is utilized to supply as random as possible seeding, referred to as a seed vector, to the subsequent processes that use the supplied seeds through pseudorandom number generation (PRNG). During the selection of search category process 1810, a particular search term is identified through the use of PRNG with a seed component of the supplied seed vector. The various possible search categories are paired with user-configurable probabilities of selection. This allows for the user of the device to choose the likelihood of any number of search categories to their preferred level of randomness. Further, this configurable process enables the user to decide what search categories should be possible to choose by setting their own list of search categories and probabilities. The natural language generator 1820 uses a supplied natural language generation model to create a natural search string based on the selected search category and supplied seed vector. The supplied seed component from the seed vector is used by a PRNG process to create what is commonly referred to in natural language processing as a temperature. This temperature value enables a natural language model to create varying search strings regardless of repeated use on a particular search category. The search execution process 1830 represents the method of executing a search through the use of a search engine on the resulting search string from the natural language generator.

Figure 9:
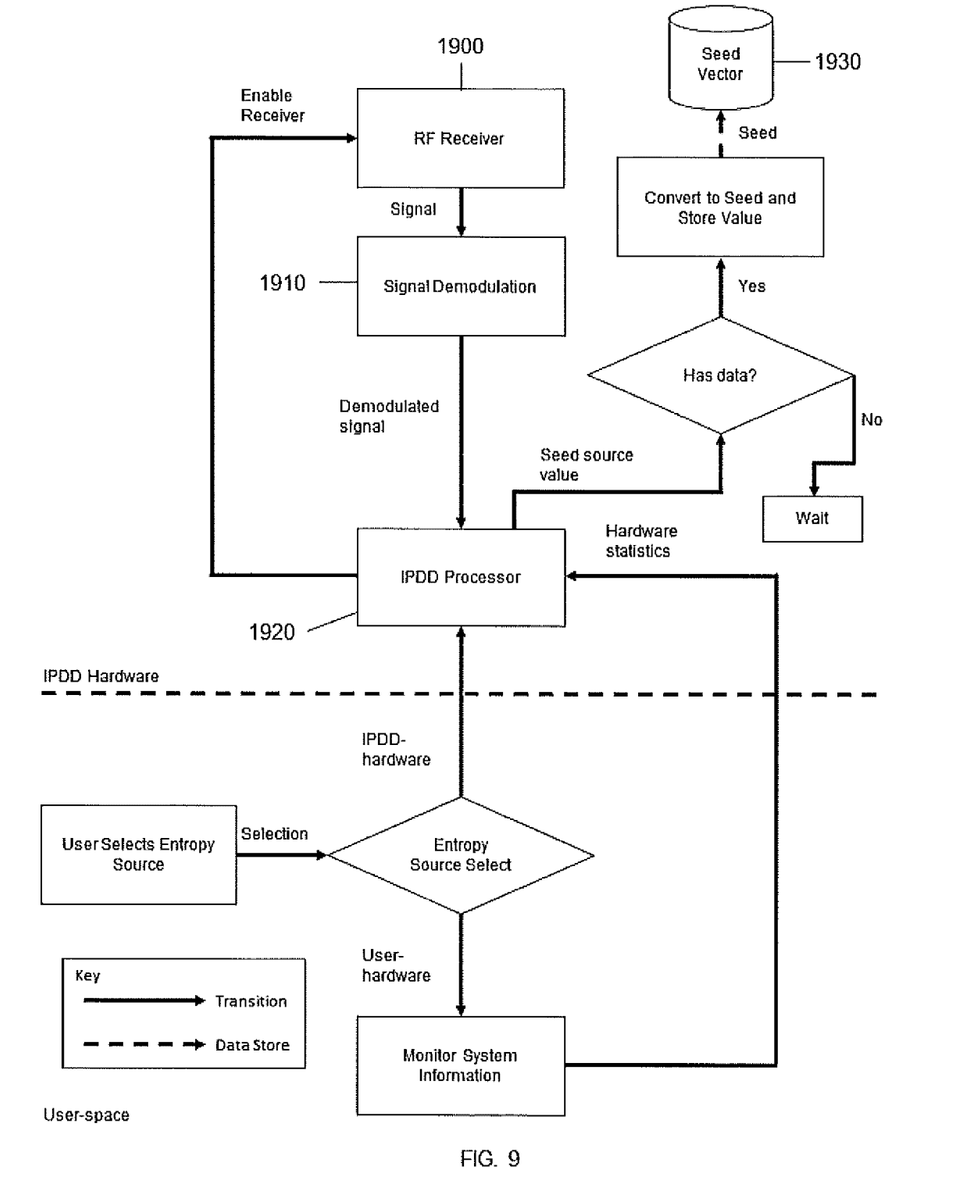
FIG. 9 depicts the specific steps and components of the entropy generator.

The entropy generator 1800 is described in FIG. 9. In one embodiment, the entropy generator utilizes the user's device hardware. In another embodiment, the entropy generator uses the IPDD device's RF receiver 1900 as an entropy source. In the first embodiment, the user's hardware is monitored through software in order to obtain system usage statistics on hardware components such as central processing unit (CPU) or random-access memory (RAM) speed or usage. In the second embodiment, a dedicated RF receiver 1900 is utilized on the IPDD device to receive, demodulate 1910, and record noise from the environment. The user's hardware statistics or demodulated noise signal is converted to a discrete seed value and recorded to the seed vector 1930.

Figure 10:
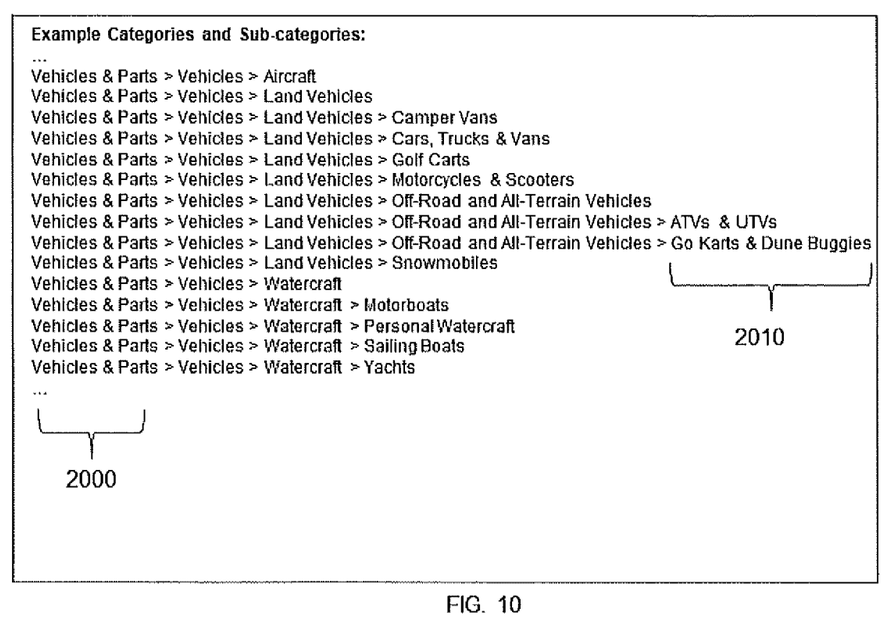
FIG. 10 illustrates a portion of the possible search categories pre-loaded on the device as well as the preferred data structure of search categories.

Looking at FIG. 10, 2000 represents the top-level search category. 2010 represents the bottom-level search category, referred to as the search sub-category. Each level of the data structure may have its own weighted probability of being selected. During the selection of search category process 1810, the search category data structure is traversed from top to bottom, with a PRNG process being used to select the category at each level. The process is completed once the final search sub-category is selected.

Figure 11:
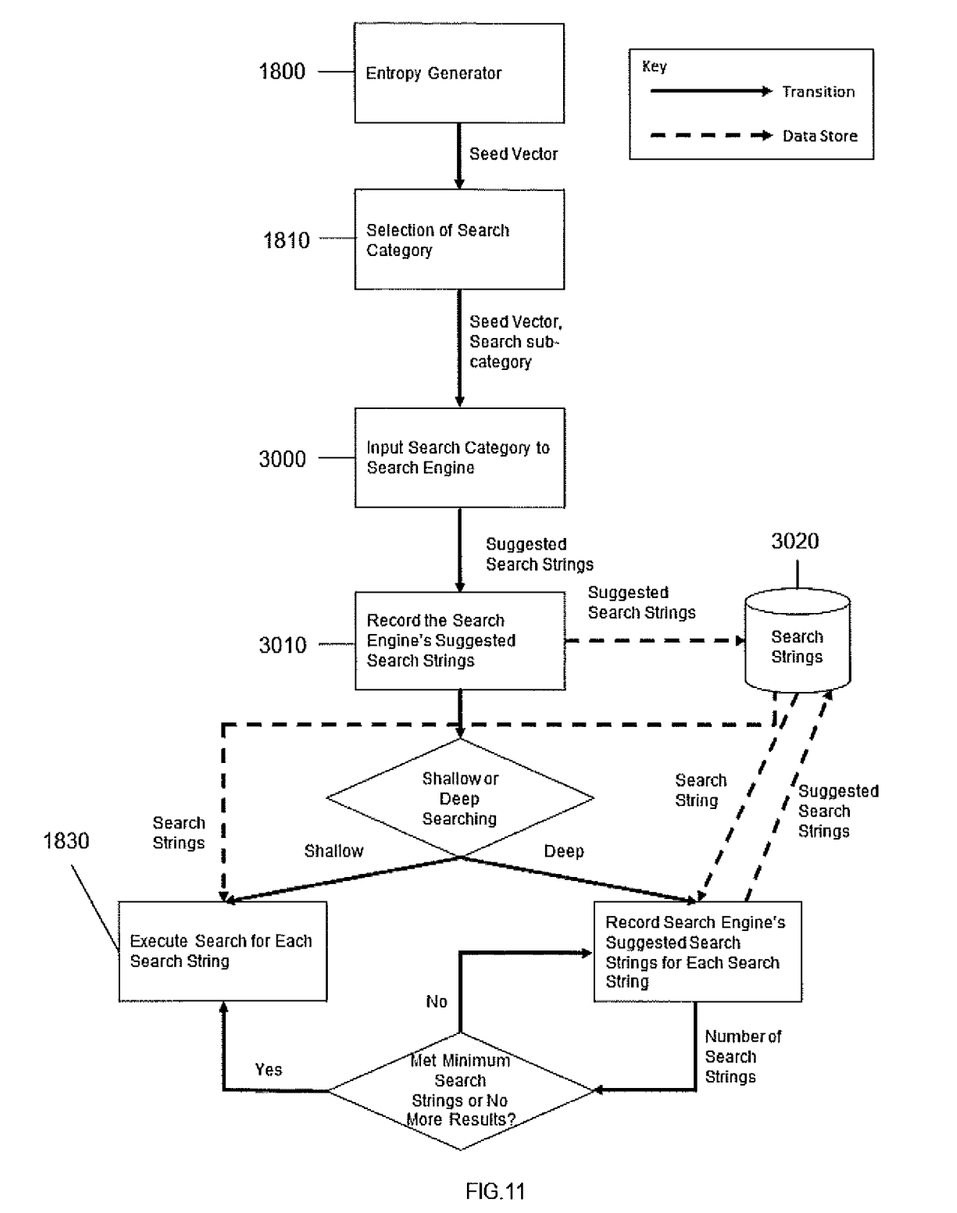
FIG. 11 demonstrates the process of generating and executing random search strings without the use of natural language generation; instead, using the recommended search strings from a specified search engine as a source for search strings.

FIG. 11 extends the described process of FIG. 8 while replacing the requirement of a natural language generator with a method of obtaining search strings from a specified search engine during the search execution process. Specifically, the search sub-category from the search category selection process 1810 is supplied to a user-specified search engine 3000. As is the case with most publicly available search engine, the search engine will respond with a list of suggested search strings to a supplied string 3010. The suggested search strings are recorded 3020 and the user must specify if they wish to perform a shallow or deep search. In a shallow search, the system will iteratively execute a search on each recorded suggested search string until the total strings are exhausted 1830. In a deep search, the system will recursively input the stored search string into a search engine 3000 and record the search engine's suggested search strings 3010. This process may be repeated until a minimum number of search strings is acquired or no more results are returned from the search engine. The system will iteratively execute a search on each recorded suggested search string until the total strings are exhausted 1830.

In another embodiment, the IPDD may maintain logs of the user's internet search activity on the IPDD hardware. This data may then be communicated over the internet to a central server in order to facilitate the creation of improved natural language generation models.

In another embodiment, the IPDD may maintain logs of the user's internet search activity on the IPDD hardware. This data may then be used locally on the device to self-improve the natural language generation model.

In another embodiment, the IPDD may have its preloaded natural language generation model updated when connected to the internet to improve its NLG ability.

Another embodiment involves the application of the beforementioned embodiments to digital marketing companies that leverage third party tracking cookies across the internet. In this embodiment, a process is done to detect and automatically accept third party tracking cookies while engaging in internet profile dilution activities. This practice would have a severely negative impact on digital marketing companies as the process of diluting the internet profile would also extend to those profiles tracked through the use of cookies.

Although exemplary embodiments of the invention have been shown and described, these are merely examples and other embodiments would be readily known to one of ordinary skill in the art. The invention should not be considered to be limited by the exemplary embodiments but rather by the appended claims.

What is claimed is:

1. A method of automatically generating internet search of topics not of interest to a person for the purpose of reducing targeted advertisements comprising the steps of:
 providing said person with a computer having an input device comprising: keyboard, microphone, and touch-screen;
 providing said computer with a communications link to the internet for said person of said computer, said communications link to the internet being managed by an internet service provider having one or more databases of internet searches made by said person of the computer and said internet service provider selling said internet searches to one or more advertisers for the purpose of targeting said person with advertisements; and providing said person with an internet search dilution device that operates when said person is not actually using said computer and wherein said internet search dilution device has internet search dilution software configured to automatically generate internet search of topics not of interest to said person comprising the steps of:
- choosing a false interest which is associated with keywords known to be relevant to the false interest;
- searching based on said false interest resulting in a set of retrieved links to web pages and videos:
- selecting one of said retrieved links to web pages and videos for additional analysis;
- downloading the selected web page or video;
- transforming said selected web page or video to obtain relevant content in text form by:
  - removing hypertext markup language (HTML) formatting to get content in text format first text;
  - transcribing audio to text format second text, based on the selected web page or video including audio,
  - determining said first text and said second text relevant to said false interest based on the presence of said keywords known to be relevant to said false interest;
  - discarding parts of the first text or the second text that is found by said determining to be irrelevant;
  - delaying processing to simulate human reading; and
  - deciding to repeat this processing or end processing.

2. The method of claim 1 wherein said internet search dilution software is further configured to simulate human browsing, after delaying processing to simulate human reading, by:
- identifying HTML links in the selected web page or video; and
- selecting one of said HTML links for downloading.

3. The method of claim 1 wherein said internet search dilution software is further configured to find new keywords associated with the false interest using machine learning on said selected web page or video.

4. The method of claim 1 wherein said internet search dilution software is further configured to mimic said person's actual internet activity by searching at the same time of day and day of week and using the same browser identifier as said person uses when actually searching the internet.

5. The method of claim 1 whereby said choosing the false interest is random.

6. The method of claim 1 whereby said person chooses the false interest.

7. An internet profile dilution device; said internet profile dilution device comprising:
- memory for storing and processing data related to operations of said internet profile dilution device;
- an entropy generator sourcing randomness from either a dedicated hardware source in system or user's hardware characteristics that are monitored during use of the system in said user's device;
- said entropy generator utilizes a radio receiver and receives a steady source of noise for randomness;
- said entropy generator utilizes said user's hardware for sourcing randomness by monitoring one or more system processes comprising central processing unit (CPU) or random-access memory (RAM) usage;
- said memory stores configuration data and user-defined preferences for customizing the operations of said internet profile dilution device;
- a list of search categories and processes to select a search category based on per-category probabilities;
- said list is pre-defined or configured with varying probabilities of selection based on user-defined preferences;
- said memory stores said list of search categories and selection process based on per-category probabilities;
- a natural language generator that generates a unique search string based on a supplied search category and randomness from said entropy generator;
- said memory stores and processes said natural language generator unique search strings based on a pre-supplied Markov model of natural language, that can be updated or modified in the future for improvement;
- said memory Stores and process said pre-supplied language model used by said natural language generator; and
- said memory stores said updates and modifications to said pre-supplied language model used by said natural language generator.

8. A method of diluting an internet search with natural language; said internet search dilution method comprising the steps of:
- generating entropy sourced from recorded noise and populating a seed vector;
- selecting a search category by use of a pseudorandom number generator seeded by a seed from said seed vector;
- generating a search string by use of a natural language generator in which a random number sourced from said pseudorandom number generator seeded by said seed vector is used as a temperature for said natural language generator;
- said natural language generator generates unique search strings based on a pre-supplied Markov model of natural language;
- said natural language generator generates unique search strings based on a pre-supplied Markov model of natural language;
- executing an internet search for said search string generated by said natural language generator and diluting user's internet profile.

9. The method of claim 8 whereby the user specifies source of search categories and weighted probability of each search category.

10. The method of claim 8 whereby the pre-supplied natural language generator model can be updated or replaced by a different model over the internet or locally.

11. The method of claim 8 whereby the natural language generator is replaced by use of a specified search engine's suggested search strings;
- said suggested search strings are recorded after supplying said specified search engine one or more search categories; and
- said suggested search strings are then searched sequentially or used to query said specified search engine recursively for more suggested search strings until a minimum number of search strings are collected or said specified search engine returns no more suggested search strings.

* * * * *